United States Patent [19]

Shinoda et al.

[11] 4,053,909

[45] Oct. 11, 1977

[54] DATA REGISTERING EQUIPMENT FOR A CAMERA

[75] Inventors: Nobuhiko Shinoda, Tokyo; Tadashi Ito; Fumio Ito, both of Yokohama; Soichi Nakamoto, Machida, all of Japan

[73] Assignee: Canon Kabushiki Kaisha, Tokyo, Japan

[21] Appl. No.: 547,462

[22] Filed: Feb. 6, 1975

[30] Foreign Application Priority Data

Feb. 12, 1974 Japan .................................. 49-16985

[51] Int. Cl.$^2$ ............................................. G03B 17/24
[52] U.S. Cl. ..................................... 354/105; 354/109
[58] Field of Search ...................... 354/105, 23 D, 109; 355/40, 41; 346/107 R, 107 A

[56] References Cited

U.S. PATENT DOCUMENTS

| | | |
|---|---|---|
| 2,907,985 | 10/1959 | Doerson, Jr. .......................... 340/173 |
| 3,430,256 | 2/1969 | Goodman ............................. 346/107 |
| 3,850,517 | 11/1974 | Stephany et al. ....................... 354/12 |
| 3,858,967 | 1/1975 | O'Donnell ......................... 354/105 X |
| 3,877,799 | 4/1975 | O'Donnell ......................... 354/105 X |
| 3,889,281 | 6/1975 | Taguchi et al. .................... 354/105 X |
| 3,953,868 | 4/1976 | Kawamura et al. .................. 354/109 |

Primary Examiner—Edna M. O'Connor
Attorney, Agent, or Firm—Toren, McGeady and Stanger

[57] ABSTRACT

The present invention relates to an equipment which converts various data, including exposure setting data, for a photograph into codes so as to be stored in a register in order that the data stored in the register is later decoded and registered on the film. The equipment comprises a decoder for reading out and decoding the stored data in accordance with a signal corresponding to the feeding of the film and a plural number of registering heads operated by means of the output of the decoder, whereby the stored data is registered on the film in general indications such as letters or figures.

5 Claims, 9 Drawing Figures

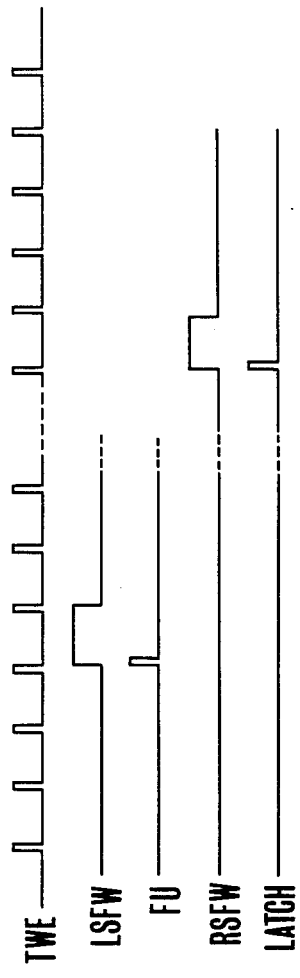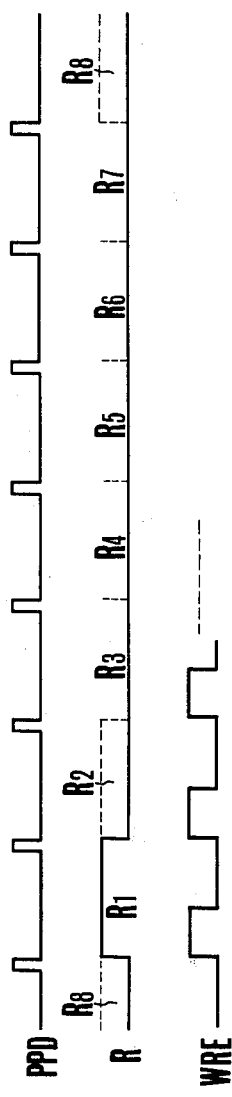

DATA REGISTERING EQUIPMENT FOR A CAMERA

BACKGROUND OF THE INVENTION

1. Field of the Invention

The present invention relates to a data recording equipment particularly recording photographic for as well as other data such as the date, place and object on a film.

2. Description of the Prior Art

Quite recently, various kinds of the electronic cameras with electronic circuits for electrically controlling the shutter mechanism or the diaphragm have been brought on the market. Some of these provide indication means for the photographic data while others are able to record some data at proper places on the film. Among the data which are desired to be registered at photographing an object by a camera, there are various informations at taking photograph as well as various data such as date to be introduced from outside of camera, whereby it would be convenient for the photographer, if those are registered at certain proper position on the film at the same time with photographing and such camera as is equipped with such registering equipment is greatly requested. As to this kind of data registering, in case the camera is controlled in a digital way, even remarkably complicated circuits can be constructed so compact as to consume small electric power thanks to the recent advanced conventional technics of the digit in such a manner that such equipment can easily be built in a compact camera. Various such registering equipments have so far being proposed, whereby the conventional equipments are so designed as to register the digital informations processed in the camera on the film in digital code which is decoded in general figures in some proper way.

A purpose of the present invention is to eliminate the above mentioned shortcomings.

Another purpose of the present invention is to synchronized the timing for registering the informations on the film by means of the positioning signal produced in accordance with the film feeding.

Further another purpose of the present invention is to control the brightness or the illuminating time of the illumination means for registering the informations in accordance with the sensibility of the film.

BRIEF DESCRIPTION OF THE DRAWINGS

FIG. 5 shows the timing chart of the signals applied to the data storing part in FIG. 4.

FIG. 7 shows the timing chart of the signals applied to the registration control part.

DESCRIPTION OF THE PREFERRED EMBODIMENTS

Below the present invention will be explained in accordance with the drawings of an embodiment of the present invention.

Figure 1:
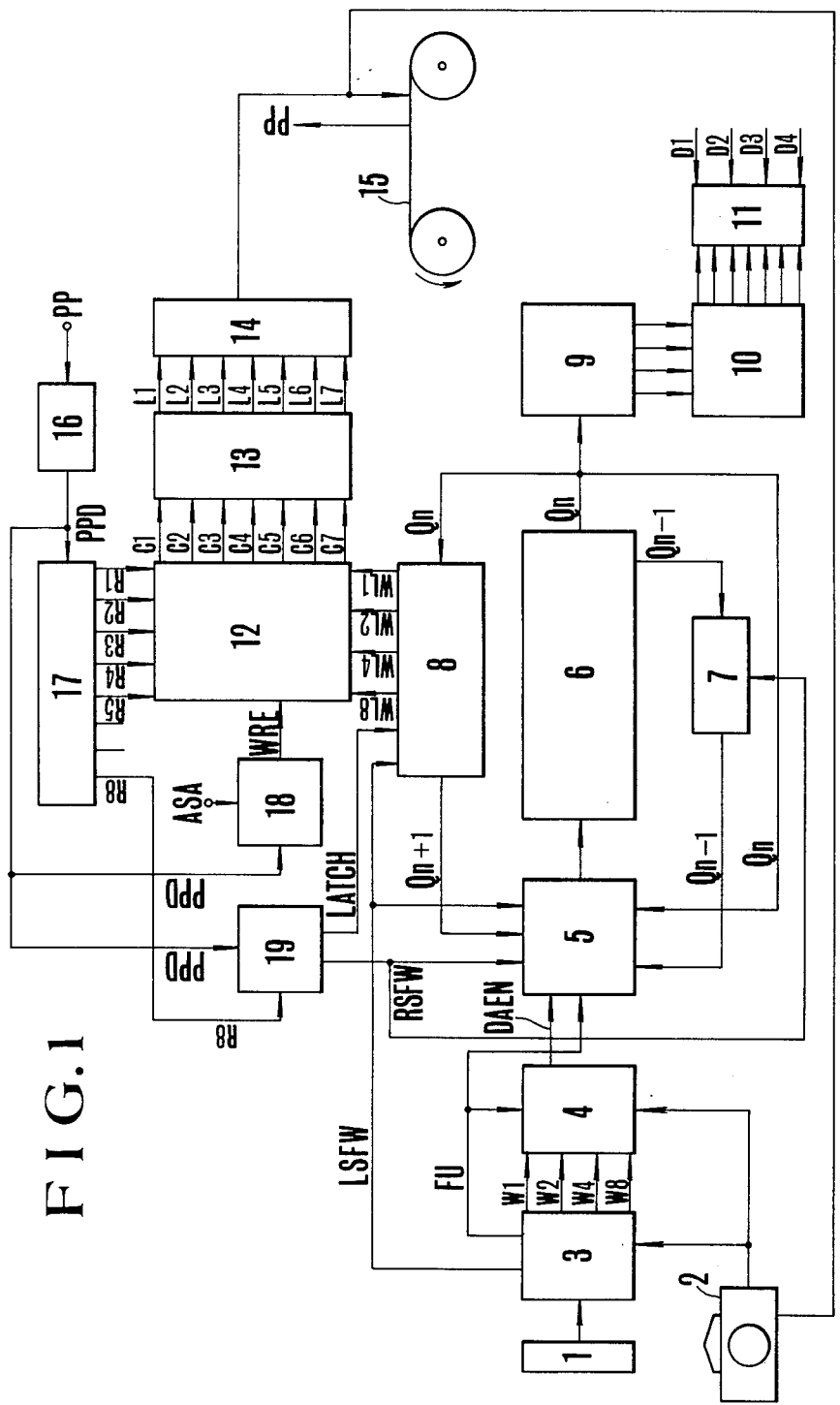
FIG. 1 shows the circuit diagram of the data registering equipment for a camera, as an embodiment of the present invention.

FIG. 1 shows the circuit diagram of the data registering equipment for a camera 2. Here a key board 1 receives various data from without the camera 2 from the processing device in which camera various kinds of the photographing informations are taken out as digital informations. A binary coding circuit 3 containing a chattering ellimination circuit, produces codes processed with weights $W_1 - W_8$ as well as a logical code FU and a signal of LSFW. Signals of $W_1 - W_8$ and FU are transformed into time series signals by means of a time sharing processing or multiplexing circuit 4 whose output DAEN is applied to a register input gate circuit of a storing circuit. The latter receives the output of a gate receiving the logical input DAEN, the left shift LSFW, FU, the right shift RSFW, $Q_{n-1}, Q_n$ and $Q_{n+1}$. The resulting output is applied to a dynamic register 6. The register 6 forms an output $Q_{n-1}$ which is applied the right shift gate circuit 7 and an output $Q_n$ which is applied to the left shift control and decoding latch circuit 8. Further the output $Q_n$ of the register 6 is applied the indication device consisting of the display latch 9, the decoder driver 10 and display 11 in such a manner that for example, letters or figures are indicated in seven segments of four figures. The signals $WL_1 - WL_8$ from the registers 6 and 8 are applied to the decoding circuit 12 consisting of a binary-decimal decoder and a decimal dot decoder so as to be decoded into dot pattern signals $C_1 - C_7$ by means of the timing pulse $R_1 - R_5$ from the clock counter 17 and amplified by the driver 13 into the signals $L_1 - L_7$ by means of which signal the dot pattern registering head consisting of LED 14 of a plural number of matrices in such a manner that letters or figures illuminate. By means of this LED, the data to be registered is exposed to the registering body 15, for example, the film in the camera. In accordance with the movement of the registering body 15, the positioning pulses PP are produced being synchronized with the clock pulses, taken out by means of the wave form reforming and synchronizing circuit 16 and counted by means of the counter 17 so as to be converted into the timing pulses $R_1 - R_8$ in such a manner that various circuits are controlled in a time series way. A brightness or time control circuit 18, in accordance with the input of the sensitivity information of the film, produces WRE so as to control the brightness or the time of the registering LED in accordance with the ASA sensitivity of the film to obtain a certain determined exposure. Further by means of the timing pulses $R_8$ coming from the counter 17 the positioning signal PPD is converted into a digital signal, producing RSFW and LATCH so as to control the right shift circuit 7 and the left shift circuit 8 in the storing part.

In the above circuit, the digital information coming from the processing device of the camera 2 or the key board 1 is converted into the time sharing signal and stored in the dynamic register 6, when the left shift is carried out. This stored content is shifted to the right by the instruction for reading so as to be read out, converted into the dot pattern signal by the decoder 12 and then illuminate in pattern of letters and figures through the illumination member LED 14, so as to be registered on the film 15. Thus the stored data are decoded by the indication device so as to be indicated visually in letters or figures at a predetermined place on the camera.

Below each part of the data registering equipment will be explained in a concrete manner, whereby the same parts as in FIG. 1 are indicated with the same figures.

Figure 2:
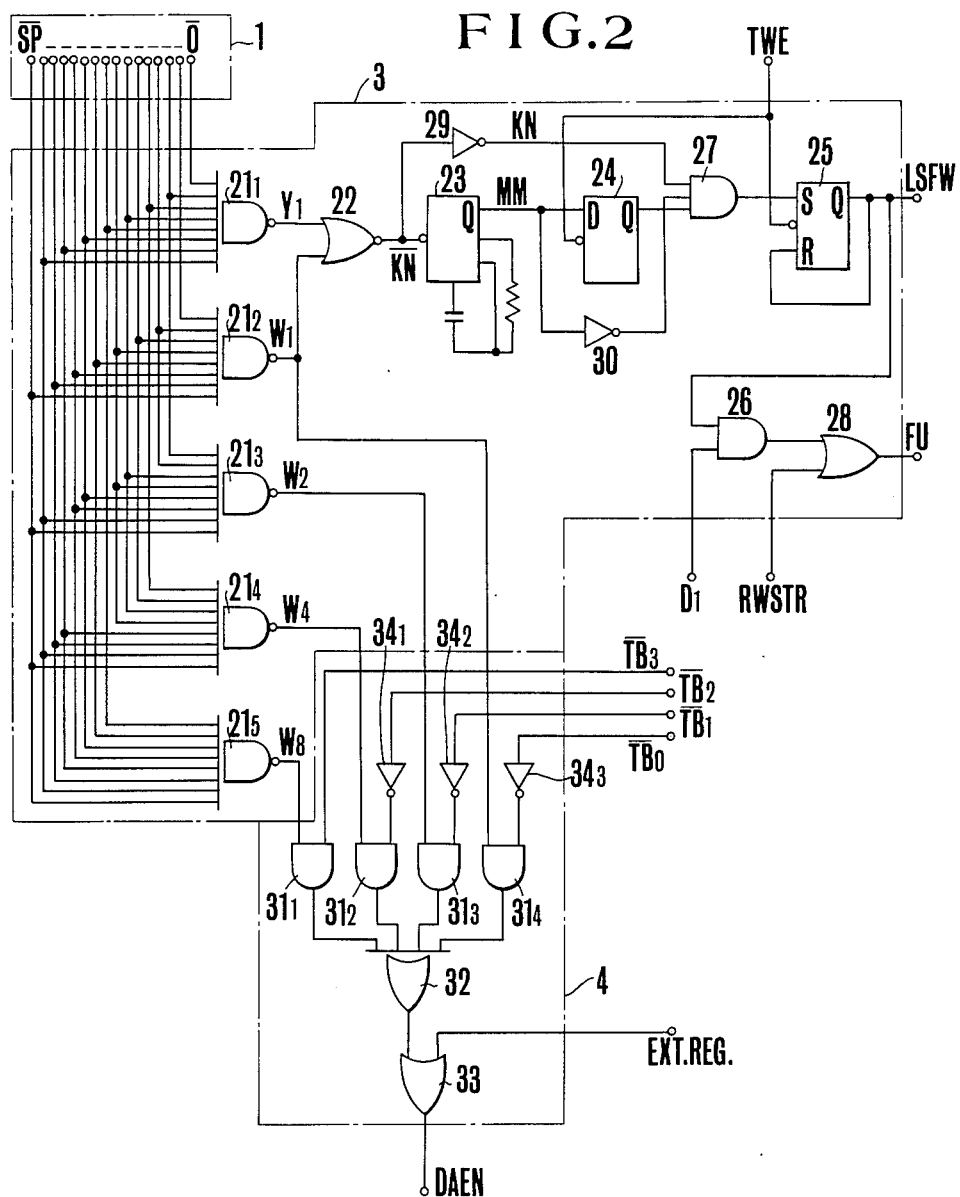
FIG. 2 shows the circuit diagram of the data input part in FIG. 1.

FIG. 2 shows the data input portion of FIG. 1. Here the key board possesses a number of key switches SP . . . O. A binary coding circuit 3 is composed of NAND gates $21_1 \ldots 21_5$, a NOR gate 22, a monostable multivibrator 23, a Flip-Flops 24, 25, AND gates 26, 27, an OR gate 28 and inverters 29 and 30. The NAND gates $21_1$, $21_2$, $21_3$, $21_4$, $21_5$ respectively produce the logical outputs $Y_1$, $W_1$, $W_2$, $W_3$ and $W_4$. When a key is switched on, the logic "0" is produced. All these keys are for the input to the NAND gate $21_1$ or $21_2$. Thus when a key is switched on, the output $Y_1$ of the NAND gate $21_1$ or the output $W_1$ or the output $W_1$ of the NAND gate $21_2$ becomes "1". As a result the output KN of the NOR gate 22 changes from "1" into "0".

The rising edge at KN triggers a monostable multivibrator 23 and produces the output "1".

When MM is "1", the first starting pulse at TWE is produced so as to set the Flip-Flop 24 on "1". The MM returns to "0" at a predetermined time set by an internal time constant circuit. Thus if the key is still then being pushed down, the Flip-Flop 25 is set at the same time with the rising edge of the TWE, so that the pulse at left shift signal LSFW is produced and maintained till the next TWE. Namely the LSFW is maintained as "1" during 1 word.

Figure 3:
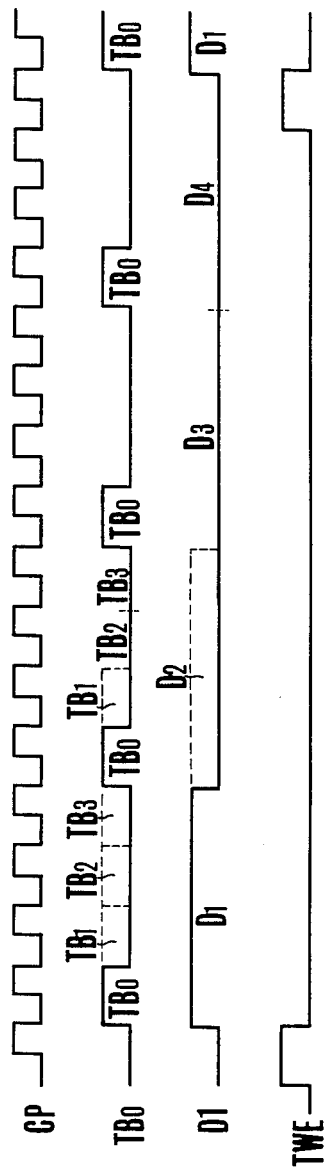
FIG. 3 shows the timing chart of the signals applied to the input part in FIG. 2.

FIG. 3 shows the timing chart of the signals applied to the data input portion in FIG. 2. Here CP shows square wave clock pulses each having a determined period. Timing pulses $TB_0$, $TB_1$, $TB_2$ and $TB_3$ are produced at the same time with the falling edge of the clock pulses. Four bits from $TB_0$ to $TB_3$ form one digit, which is produced in the sequence of $D_1$, $D_2$, $D_3$ and $D_4$. Four D from $D_1$ to $D_4$ compose one word. The starting pulse TWE is produced at the same phase as $TB_3$ in such a manner that the falling edge of TWE is synchronized with the rising edge of $D_1$.

From the timing chart in FIG. 3 it is clear that the first one digit of one word is $D_1$, whereby by means of the LSFW in FIG. 2 and this $D_1$ the AND gate 26 serves to produce FU.

Further in FIG. 2, a time sharing processing circuit 4, composed of AND gates $31_1 \ldots 31_4$, OR gates 32, 33 and inverters $34_1$, $34_2$, $34_3$ receives informations from various keys. Various key input data from the key board are respectively applied to the NAND gates $21_2$, $21_3$, $21_4$ and $21_5$. They are converted here in four bits so as to produce outputs $W_1$, $W_2$, $W_4$ and $W_8$. On a time sharing basis, in response to timing pulses $TB_0$, $TB_1$, $TB_2$ and $TB_3$ in accordance with respective weight, the outputs $W_1$ to $W_4$ the AND gate $31_1$, $31_2$, $31_3$ and $31_4$ and the OR gate 32 and 33 so as to produce digital information signals DAEN. When the input from the external register for example, the digital data from the processing device of the camera, are applied to the input of the external register in the drawing and RWSTR is entered during one word, they are converted into FU and DAEN output through the OR gates 28 and 33. These outputs are led to the storing portion as shown in FIG. 1.

Figure 4:
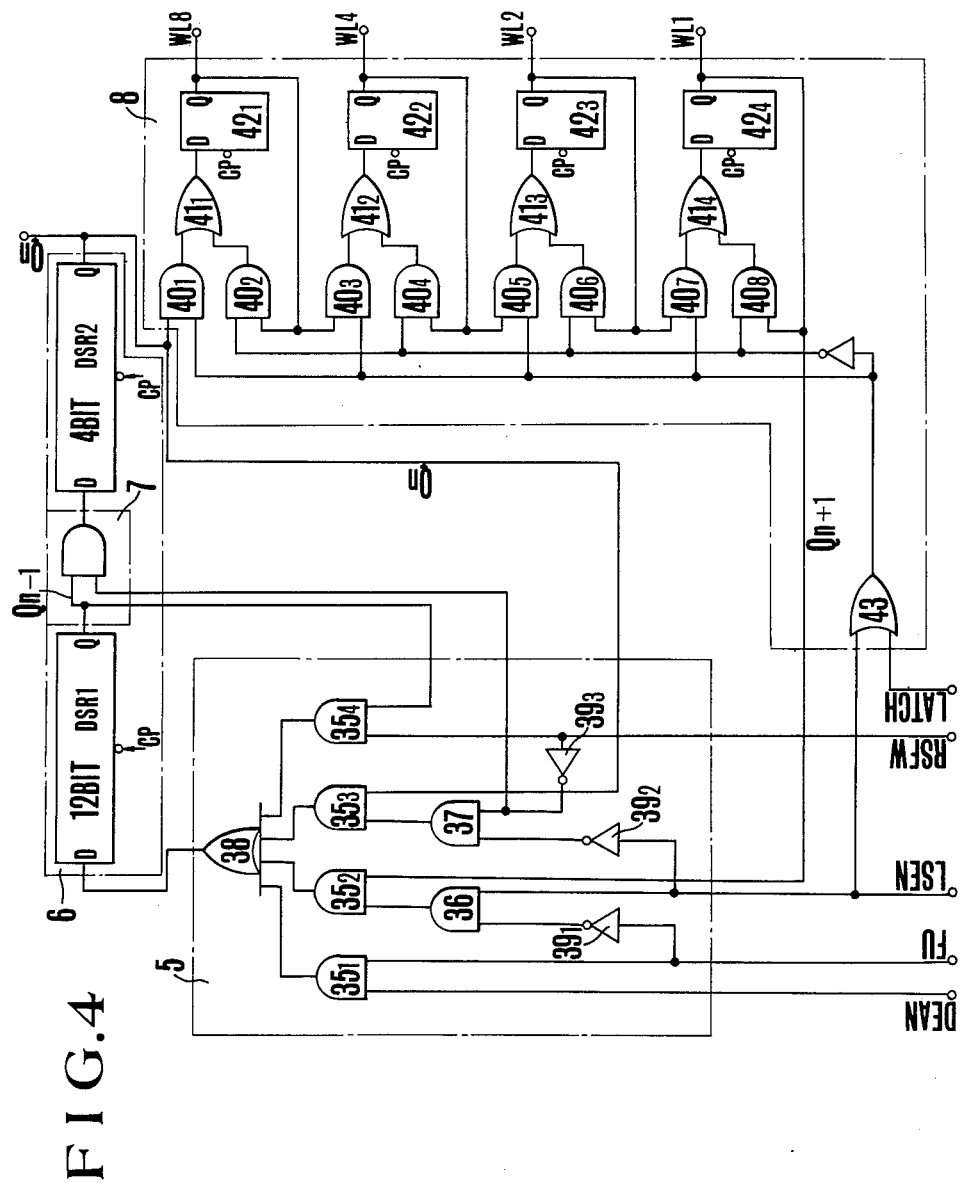
FIG. 4 shows the circuit diagram of the data storing part in FIG. 1.

FIG. 4 shows the storing part in FIG. 1, whereby DAEN, FU and LSFW are put in their input terminals from the circuit shown in FIG. 2 together with RSFW and LATCH from the digit converting circuit 19 shown in FIG. 1. The register input gate circuit 5 consists of the AND gates $35_1 \ldots 35_4$, 36, 37, the OR gate 38 and the inverters $39_1$, $39_2$, $39_3$ as shown in FIG. 5. The digital information DAEN is put in the registers $DSR_1$ and $DSR_2$ of the dynamic register 6 when shifted to the left or taken out when shifted to the right. The output of the OR gate 38 is put in the register $DSR_1$ with 12 bits, whose output $Q_{n-1}$ is put in the $DSR_2$ with 4 bits through the AND gate as the right shift gate circuit 7. All the registers carry out cyclic operation by means of the clock pulses CP.

The output $Q_n$ of $DSR_2$ is put in the data reading out circuit 8, whereby by means of the four gates, namely the AND gates $40_1 \ldots 40_8$, the OR gates $41_1 \ldots 41_4$ and the Flip-Flops $42_1 \ldots 42_4$ which form the above mentioned circuit 8, the registering signal for $WL_1$, $WL_2$, $WL_4$ and $WL_8$ is produced as output. The value $Q_n$ is the logical product of LSFW and RSFW, $Q_{n+1}$ the logical product of FU and LSFW and $Q_{n-1}$ the logical product of FU and RSFW, whereby they are put in the OR gate 38 and fed back to the input of $DSR_1$. Further LSFW and LATCH are applied to the readout circuit 8 through the OR gate 43, while the Flip-Flops $42_1 \ldots 42_4$ are triggered by the clock pulses in sequence.

In the above mentioned circuit the interruption and the read out of the data are performed in accordance with the timing chart shown in FIG. 5. The logic signal FU serves as the interruption input terminal of the register 6, whereby FU is being produced the register input is the pulse rows from DAEN while LSFW is the left shift signal for making the register 6 normally circulating with the period of 16 bits circulate with the loop of 20 bits. As is shown in FIG. 5, when FU and LSFW are produced at the same time by the key input, the digital inputs $W_8 - W_1$ are interrupted into the lowest figure above which the content from 1 bit to 12 bits is shifted to the left. When then LSFW becomes "0", the register 16 comes to circulate with 16 bits, during which the variation of the data for each TWE is not made. In this way, the data during one word is stored in the register 6.

The readout of the data out of the register 6 is carried out as is shown in FIG. 5. While synchronized with the rising up of TWE the right shift signal RSFW and the LATCH come from the digit converting circuit 19 and three digits of RSFW and one digit of LATCH are produced at the same time, the lowest figure of the data stored in the register 6 is read out as $WL_8 - WL_1$ and then the next figure from the lowest is shifted to the right in sequence. The $WL_8 - WL_1$ which are read out in a time series way are put in the decoding circuit 12 in FIG. 1. Into the decoding circuit 12, the timing pulse $R_1 - R_8$ and WRE for controlling the brightness or the time of the $LED_{14}$ as registering head are put, by means of which the digital informations are converted into the matrix dot pattern signal convenient for registration so as to illuminate the illumination member group LED in order to obtain registration code in letters or figures.

Figure 6:
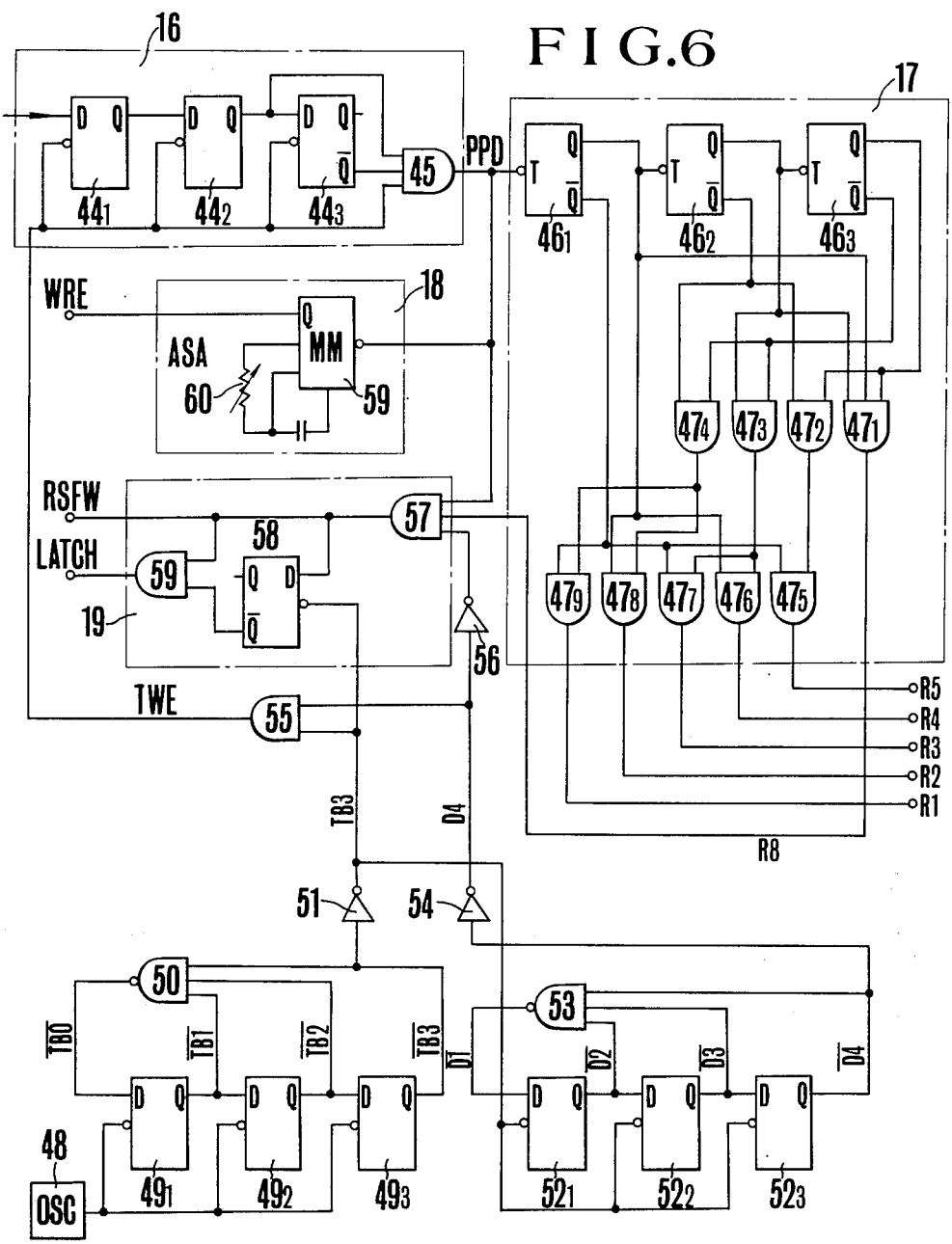
FIG. 6 shows the circuit diagram of the registration control part in FIG. 1.

FIG. 6 shows the register control part while FIG. 7 shows the timing chart for showing the relation between the positioning pulses, the timing pulses and the WRE. The positioning pulses corresponding to the movement of the film as 15 in the drawing are converted into the positioning pulses PPD synchronized with TWE (therefore also with the clock pulses CP) by means of the synchronizing circuit 16 consisting of Flip-Flop $44_1$, $44_2$, $44_3$ triggered by TWE and the AND gate 45. These pulses PPD are produced for one period of the register and applied to the counter 17 consisting of the Flip-Flop $46_1$, $46_2$, $46_3$ and the AND gates $47_1 \ldots 47_9$, at the output of which counter the timing pulses $R_1 - R_8$ are produced. On the other hand, as is shown in the timing chart in FIG. 3 the Flip-Flop $49_1$, $49_2$, $49_3$ to be triggered by the clock pulses CP and the NAND gate produces 50 bit pulses $TB_0 - TB_3$ and the Flip-Flop $52_1$, $52_2$, $53_3$ triggered by $TB_3$ converted from $TB_3$ by means of the inverter 51 and the NAND gate 53 produces the digit pulses $D_1$, $D_2$, $D_3$ and $D_4$. By making a logical product of this $TB_3$ with $D_4$ converted from $D_4$ by means of the inverter in the AND gate 55, the starting pulse TWE is produced. Then by making a logical product of the output $R_8$ of the counter, the PPD with $D_4$ converted from $D_4$ by means of the inverter 56 in the AND gate 57 of the digit converting circuit 19 the right shift signal RSFW is obtained. By making a logical product the output of the Flip-Flop 58 into which the output of this AND gate 57 is applied and which is triggered by $TB_3$ with the output of the AND gate 57 in the AND gate 57 the LATCH is produced and led to the register part. Further by producing MM at the monostable multivibrator 59 of the brightness or the time controlling circuit 18 is triggered by PPD and setting the film sensibility of the registering body 15 on the variable resistance 60 of the above mentioned circuit, the WRE is obtained at the OS output. The WRE applied to the decoding circuit 12 so as to control the current conduction time. By means of this current conduction instruction of the WRE the control of the current conduction position as well as time can be carried out independent of the length or the period of the PPD. When the octal counter 17 produces $R_8$, the right shift signal RSFW is produced between $D_1$ and $D_3$ of the PPD while the LATCH signal is produced during the first one digit of the RSFW in such a manner the lowest figure of the register 6 is put in the buffer storage $WL_8 - WL_1$. Thus the register 6 is shifted to the right by the RSFW and the counter 17 is advanced to $R_1$ synchronized with the rising up of the PPD. Thus the content of $WL_1 - WL_8$ is decoded only while the current conduction instruction WRE exists, and converted into the matrix dot pattern signal.

Figure 8:
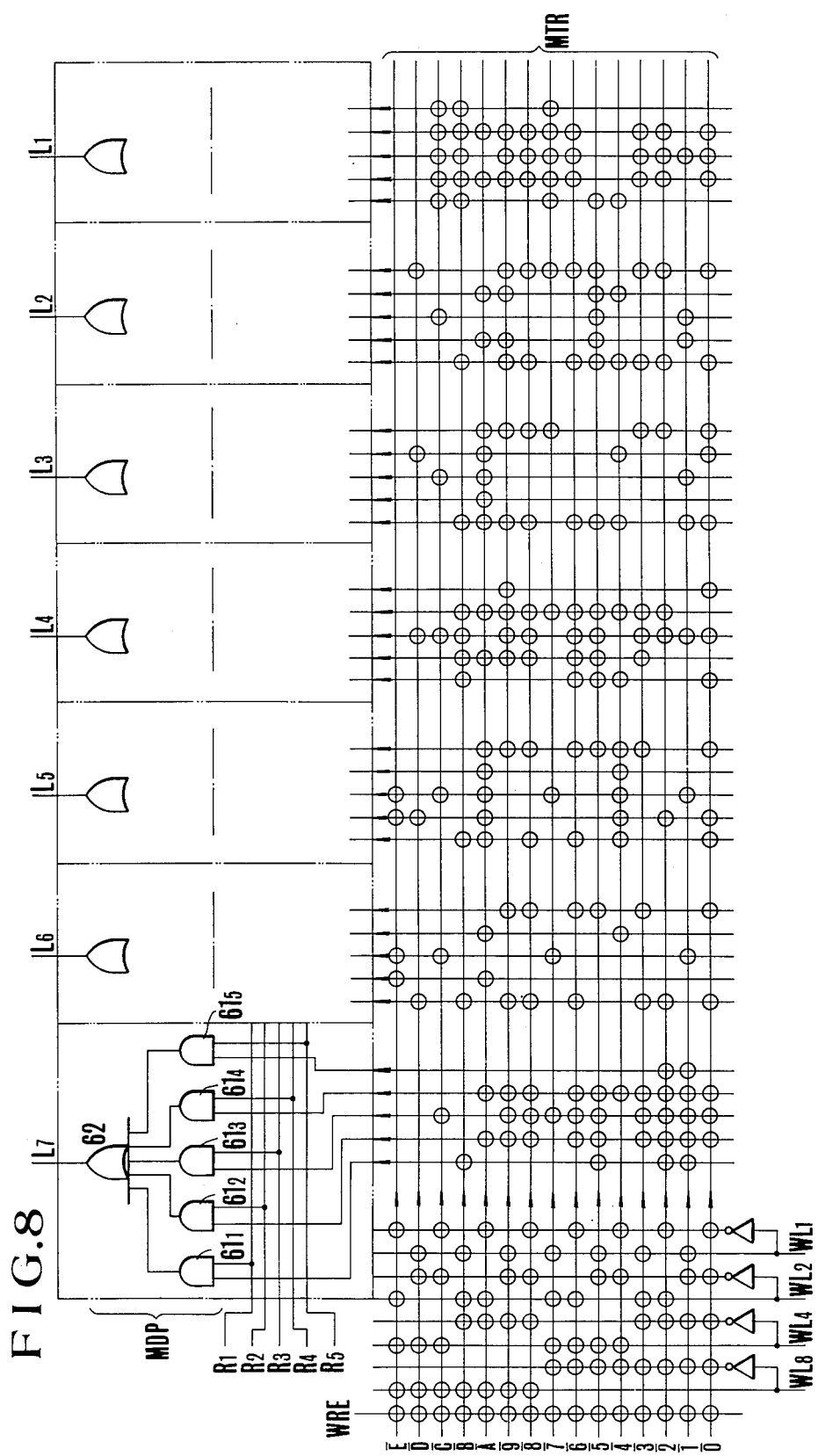
FIG. 8 shows the circuit diagram of the data registering part in FIG. 1.
Figure 9:
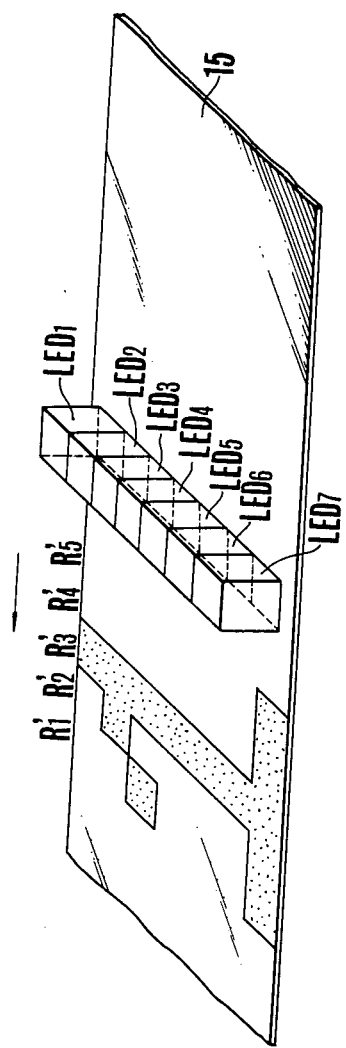
FIG. 9 shows the relation between the registering body and the illumination diode.

FIG. 8 shows the driver and the decoding circuit for converting $WL_8 - WL_1$ read out in a time series way into the matrix dot pattern signal convenient for registration. Here a diode matrix circuit MTR decodes $WL_8 - WL_1$ into the dot pattern in order to decimalize the above mentioned digital informations $WL_8 - WL_1$. The driving circuit MDP composed of AND gates $61_1 \ldots 61_5$ and OR gate 62 reads out $WL_8 \ldots WL_1$ decoded on a time series basis in accordance with each row $R_1 - R_5$. Thus the data corresponding to the time series pattern are produced as output. In this way, $WL_1 - WL_8$ are decoded into the dot pattern by MTR diode matrix circuit thus decoded signals are taken out by the driving circuit sequentially corresponding to $R_1 - R_5$. Further, because in the above mentioned process the timing pulses $R_1 - R_5$ are produced in accordance with the position of the film 15, in case for example, $WL_8 - WL_1$ are respectively 0, 0, 0, 1 when as is shown in FIG. 9 seven illuminating diodes $LED_1 \ldots LED_7$ arranged in a row are used as recording heads, the MDP is driven by the timing pulse $R_1$ when the position $R_1'$ on the registering body passes the registering head, in such a manner that $L_3$ and $L_7$ are produced as outputs so as to illuminate only the illuminating diodes $LED_3$ and $LED_7$ of the illuminating diode group LED whereby at the position $R_1'$ on the registering body only the positions corresponding to $LED_3$ and $LED_7$ are exposed to the light. According as the position of the registering body changes from $R_1' - R_5'$ the pulses $R_1 - R_5$ corresponding to $R_1' - R_5'$ are produced in such a manner that the signal corresponding to $R_1 - R_5$ on the diode matrix is read out so that a figure "1" is exposed to the registering body. In the present embodiment seven illumination diodes are arranged in a row and a letter or a figure are divided in five columns in order to form the letter or the figure so that it is sufficient to arrange the seven illuminating diodes in a row while generally altogether 35 illuminating diodes (7 × 5) are needed for obtaining the exposure of the same dot pattern as in the present embodiment, so that the present embodiment is very convenient as data registering device for the small equipment such as camera because of the small space demand. When hereby however, a letter or a figure is required to be registered on the registering body at once, five columns of seven illuminating diodes arranged in a row in a registering head have to be used in such a manner that the columns are made to correspond with the above mentioned $R_1 - R_5$ so as to produce PPD when the registering head passes the film, the illuminating diodes in the column corresponding to $R_1$ are illuminated by the pulse $R_1$ and thus the illuminating diodes in this column corresponding to $R_1 - R_5$ are illuminated in accordance with the pulses $R_1 - R_5$ in sequence so that the letter or the figure corresponding to $WL_1 - WL_8$ are registered at once.

Hereby by the three pulses $R_6 - R_8$ of the counter outputs PPD are not decoded and thus the space is made between the letters. When all of $WL_8 - WL_1$ are "1", no decoding is made in such a manner that the space corresponding to one word is empty. As mentioned above, the data stored in the register are decoded in sequence and exposed to the film as dot pattern in such a manner that by means of the development of the film the data are indicated in general letters or figures.

Hereby in order to confirm the content stored in the register, in FIG. 1 the indication part consisting of the indication decoder, the driver and the seven segment display is shown. When the same system is used for the indication pattern and for the above mentioned printing pattern the ROM is used in common for reading out and for indication.

As explained above, the letters or the figures registered by means of the data registering equipment according to the present invention are those which can be understood by general people whereby it is not necessary to decode the register manually or mechanically so that the register can directly be used and therefore the equipment is very convenient as the data registering equipment for the camera, which is very profitable.

What is claimed is:

1. For a camera defining a film position and forming exposure information signals, a data recording apparatus comprising:

data setting means for having data set therein and generating pulses corresponding to a set value, receiving means for receiving exposure information signals in the form of pulses, a first gate coupled to said data setting means and receiving means for passing one of the output signals of said data setting means and exposure information signal of the receiving means, a counter coupled to the first gate for memorizing the outputs of the first gate, a decoder coupled to the counter for decoding the content memorized by the counter, recording means coupled to the decoder for applying the memorized content decoded by the decoder to the film position as visible indications, first pulse generating means to generate pulse signals in response to shifting of the position of the film, second pulse generating means coupled to said first pulse generating means for generating timing pulses based on the pulse signals from said first pulse generating means and for setting the timing of the application by the recording means on the basis of the timing pulses thereof, and a second gate connected between said decoder and recording means and coupled to said second pulse generator means for applying the output of said decoder on the recording means in synchonism with the timing pulses of said second pulse generating means.

2. An equipment according to claim 1 in which the recording means comprises lighting means and exposure control means for controlling the exposure on the film by said lighting means in accordance with the sensitivity of said film.

3. An equipment according to claim 2, in which said lighting means include illuminating diodes.

4. An apparatus according to claim 1, in which the data setting means comprises a key switch which sets the data manually, means coupled to the key switch for coding the output from the key switch, and means coupled to the coding means for arranging the output from the coding means into sequential signals.

5. A camera comprising:

a lens, film holding means for defining a film position, exposure control means between the lens and the film position for assuming operating conditions which establish the amount of light passing between said lens and the film position, and for generating exposure signals indicative of the operating conditions, data setting means for having data set therein and generating data pulses corresponding to the data set therein, receiving means coupled to said exposure control means for receiving the exposure signals and generating exposure indicating pulses corresponding to the exposure signals, a first gate coupled to said data setting means and said receiving means for passing the pulses from said data setting means and said receiving means, a counter coupled to the first gate for memorizing the output of the first gate, a decoder coupled to the counter for decoding the content memorized by the counter, recording means coupled to the decoder for applying the memorized content decoded by the decoder to the film position as visible indications, film sensing means at the film position for sensing the position of the film, pulse generating means coupled to the film sensing means for generating timing pulse signals in response to shifting of the position of the film, and for setting the timing of the application by the recording means on the basis of timing pulses and a second gate connected between said decoder and said recording means and coupled to said second generator means for applying the output of said decoder on the recording means in synchronism with the timing pulses of said second pulse generating means.

* * * * *